US010284827B2

(12) United States Patent
Xiao

(10) Patent No.: US 10,284,827 B2
(45) Date of Patent: May 7, 2019

(54) AUTOMATIC ADJUSTMENT METHOD AND DEVICE FOR COLOR WHEEL

(71) Applicants: Hisense Co., Ltd., Shandong (CN); HISENSE USA CORP., Suwanee, GA (US); Hisense International Co., Ltd., Shandong (CN)

(72) Inventor: Jichen Xiao, Shandong (CN)

(73) Assignees: HISENSE CO., LTD., Shandong (CN); HISENSE USA CORP., Suwanee, GA (US); HISENSE INTERNATIONAL CO., LTD., Shandong (CN)

(*) Notice: Subject to any disclaimer, the term of this patent is extended or adjusted under 35 U.S.C. 154(b) by 93 days.

(21) Appl. No.: 15/205,793

(22) Filed: Jul. 8, 2016

(65) Prior Publication Data
US 2017/0041578 A1 Feb. 9, 2017

(30) Foreign Application Priority Data
Aug. 4, 2015 (CN) .......................... 2015 1 0471355

(51) Int. Cl.
H04N 9/31 (2006.01)
H04N 9/12 (2006.01)
(52) U.S. Cl.
CPC ......... H04N 9/3114 (2013.01); H04N 9/3194 (2013.01)
(58) Field of Classification Search
CPC .................................................. H04N 9/3114

USPC ........................................................ 348/734
See application file for complete search history.

(56) References Cited

U.S. PATENT DOCUMENTS

| 2006/0002109 | A1* | 1/2006 | Imade | H04N 9/3114 |
| | | | | 362/231 |
| 2012/0206475 | A1* | 8/2012 | Bryant | G11B 27/034 |
| | | | | 345/589 |
| 2013/0307995 | A1* | 11/2013 | Nakata | H04N 9/3194 |
| | | | | 348/189 |

* cited by examiner

Primary Examiner — Jefferey F Harold
Assistant Examiner — Justin B Sanders
(74) Attorney, Agent, or Firm — McDermott Will & Emery LLP

(57) ABSTRACT

The disclosure provides an automatic adjustment method and device for a color wheel. The method comprises: collecting a first frame image corresponding to an actual projection region; determining a proportion of normal pixels in the first frame image according to pixel information of the first frame image; determining a target correction value of the color wheel and each color switch according to the proportion of normal pixels in the first frame image; and adjusting the coordination parameter of the color wheel and each color switch to the target correction value, wherein the proportion of normal pixels in the image corresponding to the actual projection region obtained by adjusting the coordination parameter of the color wheel and each color switch to the target correction value is within an interval of [a %, 100%]; and the proportion of normal pixels in the first frame image is lower than a %, a % being lower than or equal to 100%.

17 Claims, 6 Drawing Sheets

AUTOMATIC ADJUSTMENT METHOD AND DEVICE FOR COLOR WHEEL

CROSS-REFERENCE TO RELATED APPLICATIONS

The application claims the priority of Chinese Patent Application No. 201510471355.3, submitted to Chinese Patent Office on Aug. 4, 2015 and titled "Automatic Adjustment Method and Device for Color Wheel", the entirety of which is incorporated herein by reference.

FIELD OF TECHNOLOGY

The disclosure relates to the technical field of projection, and in particular to an automatic adjustment method and device for a color wheel.

BACKGROUND

Digital Light Procession (DLP in short) projectors generally utilize one to two color wheels to project light with required color onto digital micro-mirror devices (DMD in short). A color wheel generally consists of several colors, and light can passes through only one color region of the color wheel every moment. According to differences in design, the order and duration in which light passes through each color region are different from each other. However, in a same design, the order and respective time period in which light passes through each color region are constant. For example, if it takes a color wheel 10 s (the actual time is much shorter than 10 s, and this value is merely provided as an example here) to make a round, an order in which light passes through the color wheel can be designed as a following order: light successively passes through a red light region, a green light region and a blue light region, wherein the time required for light to pass through the red light region is 5 s, pass through the green light region is 3 s and pass through the blue light region is 2 s.

SUMMARY OF DISCLOSURE

One embodiment of the disclosure provides an automatic adjustment method for a color wheel, including:

collecting, by a collection part, a first frame image corresponding to an actual projection region;

determining, by a processor, a proportion of normal pixels in the first frame image according to pixel information of the first frame image;

determining, by the processor, a target correction value of a coordination parameter of the color wheel and each color switch according to the proportion of normal pixels in the first frame image; and adjusting, by an adjustment part, the coordination parameter of the color wheel and each color switch to the target correction value; wherein a proportion of normal pixels in an image corresponding to an actual projection region obtained by adjusting the coordination parameter of the color wheel and each color switch to the target correction value is within an interval of [a %, 100%]; and wherein a proportion of normal pixels in the first frame image is lower than a %, a % being lower than or equal to 100%.

Another embodiment of the disclosure provides an automatic adjustment device for a color wheel, including: a collection part, a processor, a memory and an adjustment part;

the collection part is configured to collect a first frame image corresponding to an actual projection region;

the memory is configured to store programs;

the processor is configured to read programs in the memory and perform operations of:

determining a proportion of normal pixels in the first frame image according to pixel information of the first frame image; and determining a target correction value of a coordination parameter of the color wheel and each color switch according to the proportion of normal pixels in the first frame image; and the adjustment part is configured to adjust the coordination parameter of the color wheel and each color switch to the target correction value, wherein the proportion of normal pixels in the image corresponding to the actual projection region obtained by adjusting the coordination parameter of the color wheel and each color switch to the target correction value is within an interval of [a %, 100%], and wherein the proportion of normal pixels in the first frame image is lower than a %, a % being lower than or equal to 100%.

DETAILED DESCRIPTION OF THE PREFERRED EMBODIMENTS

Technical solutions in the embodiments of the present disclosure will be described clearly and completely with reference to the accompanying drawings in the embodiments of the present disclosure. Obviously, the embodiments to be described are merely some but not all of embodiments of the present disclosure. Based on the embodiments of the present disclosure, all other embodiments obtained by those skilled in the art without paying any creative effort shall fall into the protection scope of the disclosure.

To clearly describe the technical solutions in the embodiments of the disclosure, in the embodiments of the disclosure, characters such as "first", "second" and the like are used to differentiate same or similar items with substantially same functions and effects. It may be understood by those skilled in the art that characters such as "first", "second" and the like are not intended to limit the number and the execution order.

Figure 1:
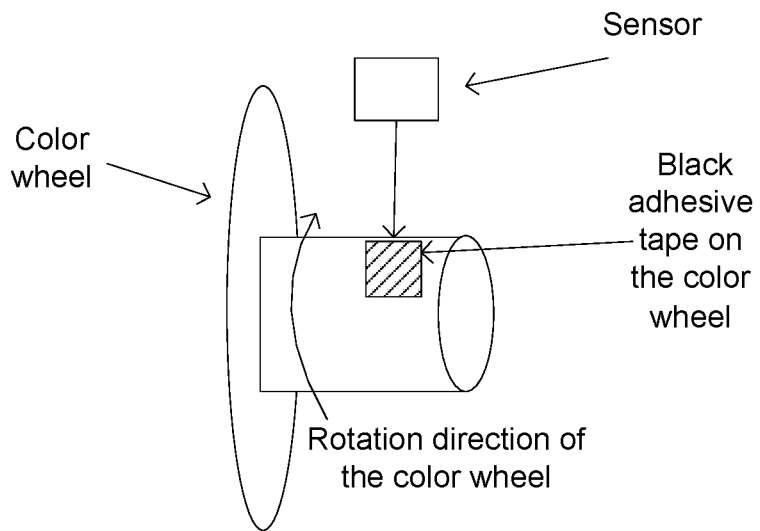
FIG. 1 is a schematic operation diagram of a color wheel in the prior art.
Figure 2:
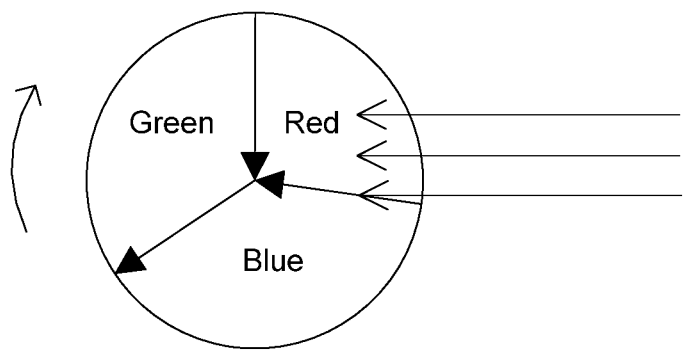
FIG. 2 is a schematic view when light exactly passes through a red region and red light is transmitted, when a color wheel is normal in the prior art.

In a digital light procession projector, a color wheel generally determines, according to a black adhesive tape on the color wheel, which one color region light passes through. As shown in FIG. 1, it is detected by a sensor above a color wheel in a projection system that the color wheel has just rotated over the position of the adhesive tape. Exemplarily, as shown in FIG. 2, the red light region is reached once the color wheel rotates over the adhesive tape, and in this case, a red switch of the projection system is turned on so that red light is transmitted. In this way, the red light can be visible. It should be noted that the red switch and the corresponding green switch and blue switch mainly control a color level of light from the color wheel. The switches can act on a light source of the digital light procession projector to control the color level of light emitted from the light source; the switches can also be located between the light source and the color wheel to control the color level of light incident onto the color wheel; and the switches can also be located behind the color wheel to control the color level of light from the color wheel. Of course, the switches can also be located at other positions, as long as the color level of light from the color wheel can be controlled thus to control the color level of the displayed picture.

Figure 3:
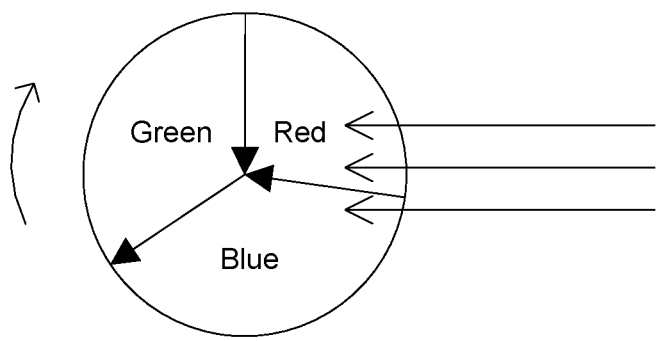
FIG. 3 is a schematic view when part of light passes through a blue region and blue light is transmitted, when a color wheel is abnormal in the prior art.
Figure 4:
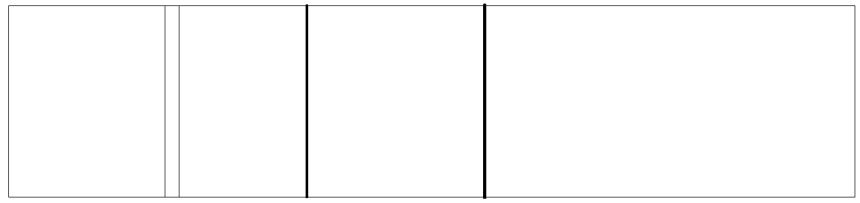
FIG. 4 is a schematic view of a problematic image card in the prior art.

However, due to factors such as assembly and specifications, the position of the adhesive tape on the color wheel may be inaccurate. In such a case, when the sensor above the color wheel detects that the color wheel has just rotated over the adhesive tape, the color wheel might not have rotated to a region of a certain color completely. Now, there is light passing through other color regions of the color wheel. As a result, light from the color wheel is not in a single color. For example, as shown in FIG. 3, when the sensor above the color wheel detects that the color wheel has just rotated over the adhesive tape, the color wheel does not rotate to the red light region completely, and a part of the color wheel is still in the blue region. As a result, light from the color wheel now is not red light only, but blue light first and then red light. However, the red switch considers all the light from the color wheel as red light. That is, the rotation phase of the color wheel is not matched with the timing phase of the switch, and as a result, light displayed eventually is of other colors. In this way, in terms of a picture, some vertical lines will occur, as shown in FIG. 4.

To solve the above-mentioned problems, in the prior art, the color wheel originally set is adjusted manually to eliminate the vertical lines. However, in this way, human factors impose a relatively great influence, and when the number of vertical lines occurring in the image card is small or the duration thereof is short, the vertical lines are hard to be observed. Consequently, the adjustment of the color wheel is not high in accuracy.

Thus, seeking for an automatic adjustment method for a color wheel, which can adjust the color wheel in a more intelligent and more accurate way, is an urgent technical issue at present.

Figure 5:
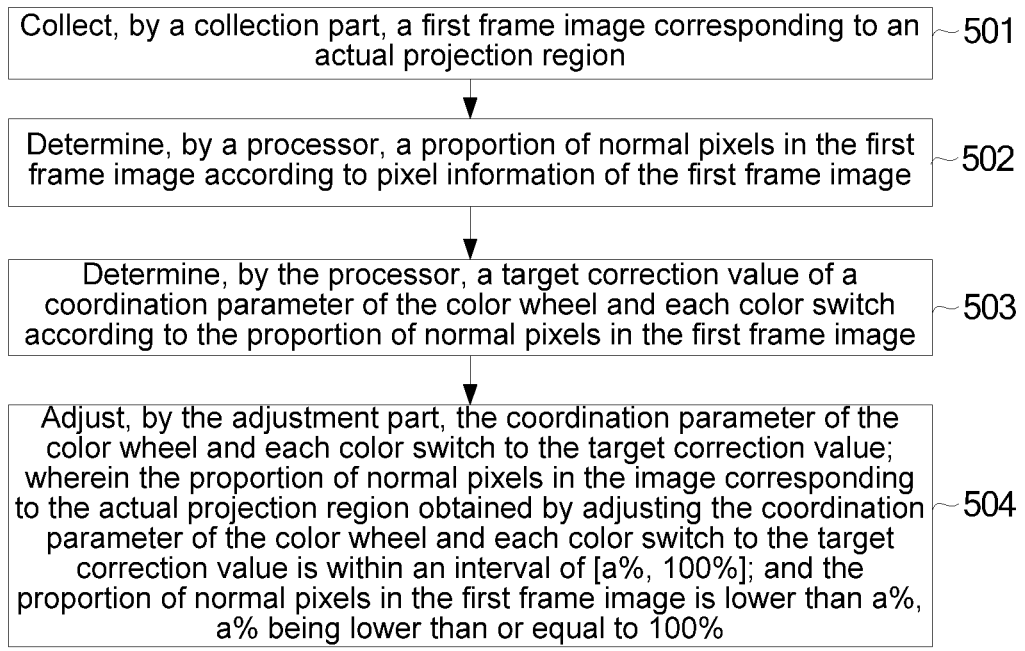
FIG. 5 is a schematic flowchart 1 of an automatic adjustment method for a color wheel according to one embodiment of the disclosure.

One embodiment of the disclosure provides an automatic adjustment method for a color wheel, which can solve the above technical problems. As shown in FIG. 5, the method includes the following steps.

S501: A first frame image corresponding to an actual projection region is collected by a collection part.

In one embodiment of the disclosure, the collection part can be a photosensitive element. That is, an image corresponding to an actual projection region can be collected by a photosensitive element, for example, a camera.

The photosensitive element can be arranged on a projector, and can also be arranged on an independent apparatus outside the projector. This is not specifically limited in the embodiment of the disclosure.

S502: A proportion of normal pixels in the first frame image is determined by a processor according to pixel information of the first frame image.

In one embodiment of the disclosure, after a frame image is collected, pixel information corresponding to the frame image can be obtained. The pixel information can be represented by a color coordinate of a pixel point. The color coordinate includes three types of data respectively indicating how much red information, blue information and green information the pixel point has. For example, the color coordinate is (R, G, B). When represented by a 8-bit $(max(RGB)=2^8-1=255)$ bitmap, the color coordinate of a red pixel point can be (255, 0, 0), which indicates that the pixel point is all red information; and the color coordinate of a white pixel point can be (255, 255, 255), which indicates that the pixel point is mixed by all the red color, blue color and green color. Since there is a great difference between a color coordinate of a pixel point in a vertical line in the first frame image and a color coordinate of a normal pixel point, it is easy to determine whether the pixel point in the first frame image is a normal pixel point or not. In this way, by dividing the number of normal pixel points by the number of all pixel points, a proportion of normal pixels in the first frame image can be obtained.

Exemplarily, assuming that a white image is to be projected into a projection region and that there are total 100 pixel points in the first frame image corresponding to the projection region, among which there are 95 pixel points having a color coordinate of (255, 255, 255), the proportion of normal pixels in the first frame image is 95% (95/100=95%).

It should be noted that, in another embodiment of the disclosure, the position of the vertical line in the first frame image and its size can be determined according to the pixel information. In this way, the color wheel may be automatically adjusted according to the position of the vertical line in the first frame image and its size by the following steps. Exemplarily, the position of the vertical line in the first frame image and its size can be determined according to the position (i.e., which pixel the abnormal pixel point is located at in longitudinal and transverse directions) of an abnormal pixel point in the first frame image.

S503: A target correction value of a coordination parameter of the color wheel and each color switch is determined by the processor according to the proportion of normal pixels in the first frame image.

Wherein, a coordination parameter of the color wheel and each color switch can be a coordination angle of the color wheel and each color switch, and can also be a coordination duration of the color wheel and each color switch. This is not specifically limited in the embodiment of the disclosure.

Exemplarily, the coordination angle of the color wheel and each color switch can be that the red switch is turned on 8 degrees later after the sensor detects the adhesive tape on the color wheel; and the coordination duration of the color wheel and each color switch can be such that the red switch is turned on 1 s later after the sensor detects the adhesive tape on the color wheel.

S504: The coordination parameter of the color wheel and each color switch is adjusted by an adjustment part to the target correction value, wherein a proportion of normal pixels in an image corresponding to an actual projection region obtained by adjusting the coordination parameter of the color wheel and each color switch to the target correction value is within an interval of [a %, 100%], and wherein a proportion of normal pixels in the first frame image is lower than a %, a % being lower than or equal to 100%.

Figure 6:
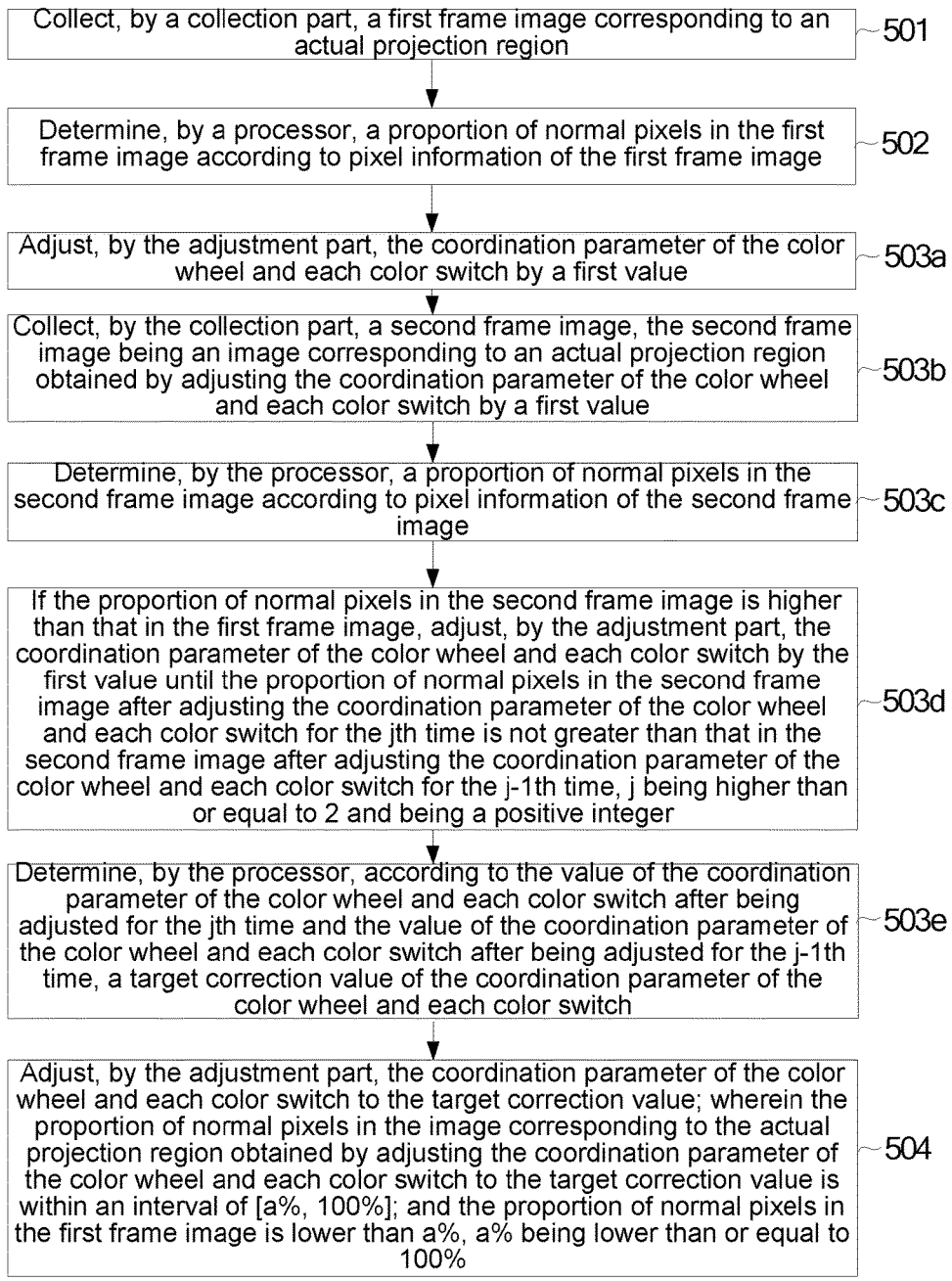
FIG. 6 is a schematic flowchart 2 of the automatic adjustment method for a color wheel according to one embodiment of the disclosure.

In one embodiment of the disclosure, before step S503, as shown in FIG. 6, the automatic adjustment method for a color wheel can also include:

S503a: adjusting, by the adjustment part, the coordination parameter of the color wheel and each color switch by a first value;

S503b: collecting, by the collection part, a second frame image, the second frame image being an image corresponding to an actual projection region obtained by adjusting the coordination parameter of the color wheel and each color switch by the first value;

S503c: determining, by the processor, a proportion of normal pixels in the second frame image according to pixel information of the second frame image; and S503d: if the proportion of normal pixels in the second frame image is higher than that in the first frame image, adjusting, by the adjustment part, the coordination parameter of the color wheel and each color switch by the first value until the proportion of normal pixels in the second frame image after adjusting the coordination parameter of the color wheel and each color switch for the $j^{th}$ time is not greater than that in the second frame image after adjusting the coordination parameter of the color wheel and each color switch for the $j-1^{th}$ time, j being higher than or equal to 2 and being a positive integer.

The step S503 of determining, by the processor, a target correction value of the coordination parameter of the color wheel and each color switch according to the proportion of normal pixels in the first frame image, can specifically include:

S503e: determining, by the processor, according to the value of the coordination parameter of the color wheel and each color switch after being adjusted for the $j^{th}$ time and the value of the coordination parameter of the color wheel and each color switch after being adjusted for the $j-1^{th}$ time, a target correction value of the coordination parameter of the color wheel and each color switch.

Figure 7:
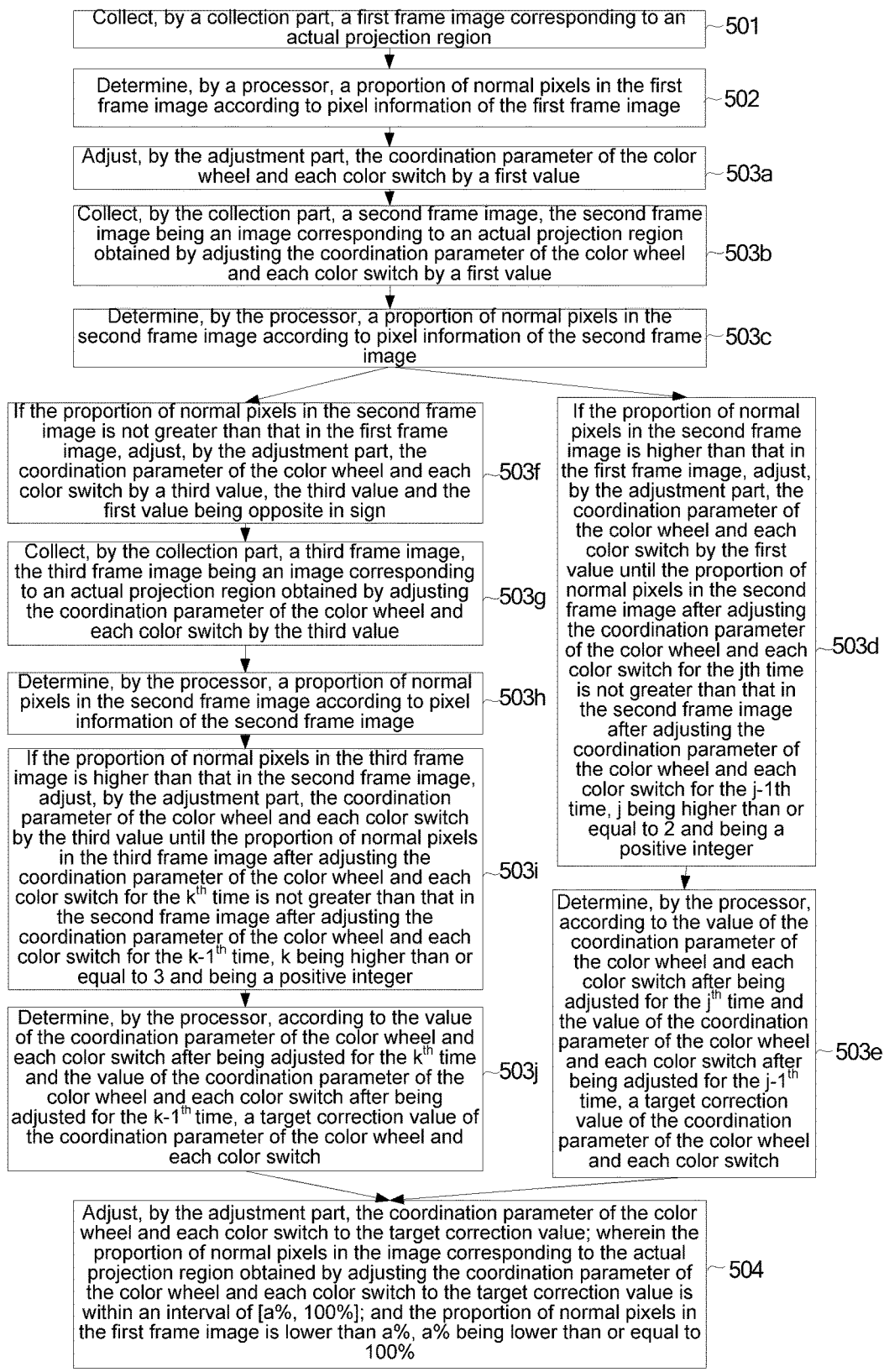
FIG. 7 is a schematic flowchart 3 of the automatic adjustment method for a color wheel according to one embodiment of the disclosure.

In one embodiment of the disclosure, as shown in FIG. 7, after determining, by the processor, the proportion of normal pixels in the second frame image according to the pixel information of the second frame image (step S503c), the method further includes:

S503f: if the proportion of normal pixels in the second frame image is not greater than that in the first frame image, adjusting, by the adjustment part, the coordination parameter of the color wheel and each color switch by a third value, the third value and the first value being opposite in sign;

S503g: collecting, by the collection part, a third frame image, the third frame image being an image corresponding to an actual projection region obtained by adjusting the coordination parameter of the color wheel and each color switch by the third value;

S503h: determining, by the processor, a proportion of normal pixels in the third frame image according to pixel information of the third frame image;

S503i: if the proportion of normal pixels in the third frame image is higher than that in the second frame image, adjusting, by the adjustment part, the coordination parameter of the color wheel and each color switch by the third value until the proportion of normal pixels in the third frame image after adjusting the coordination parameter of the color wheel and each color switch for the $k^{th}$ time is not greater than that in the third frame image after adjusting the coordination parameter of the color wheel and each color switch for the $k-1^{th}$ time, k being higher than or equal to 3 and being a positive integer.

The step S503 of determining, by the processor, a target correction value of the coordination parameter of the color wheel and each color switch according to the proportion of normal pixels in the first frame image, can specifically include:

S503j: determining, by the processor, according to the value of the coordination parameter of the color wheel and each color switch after being adjusted for the $k^{th}$ time and the value of the coordination parameter of the color wheel and each color switch after being adjusted for the $k-1^{th}$ time, a target correction value of the coordination parameter of the color wheel and each color switch.

Figure 8:
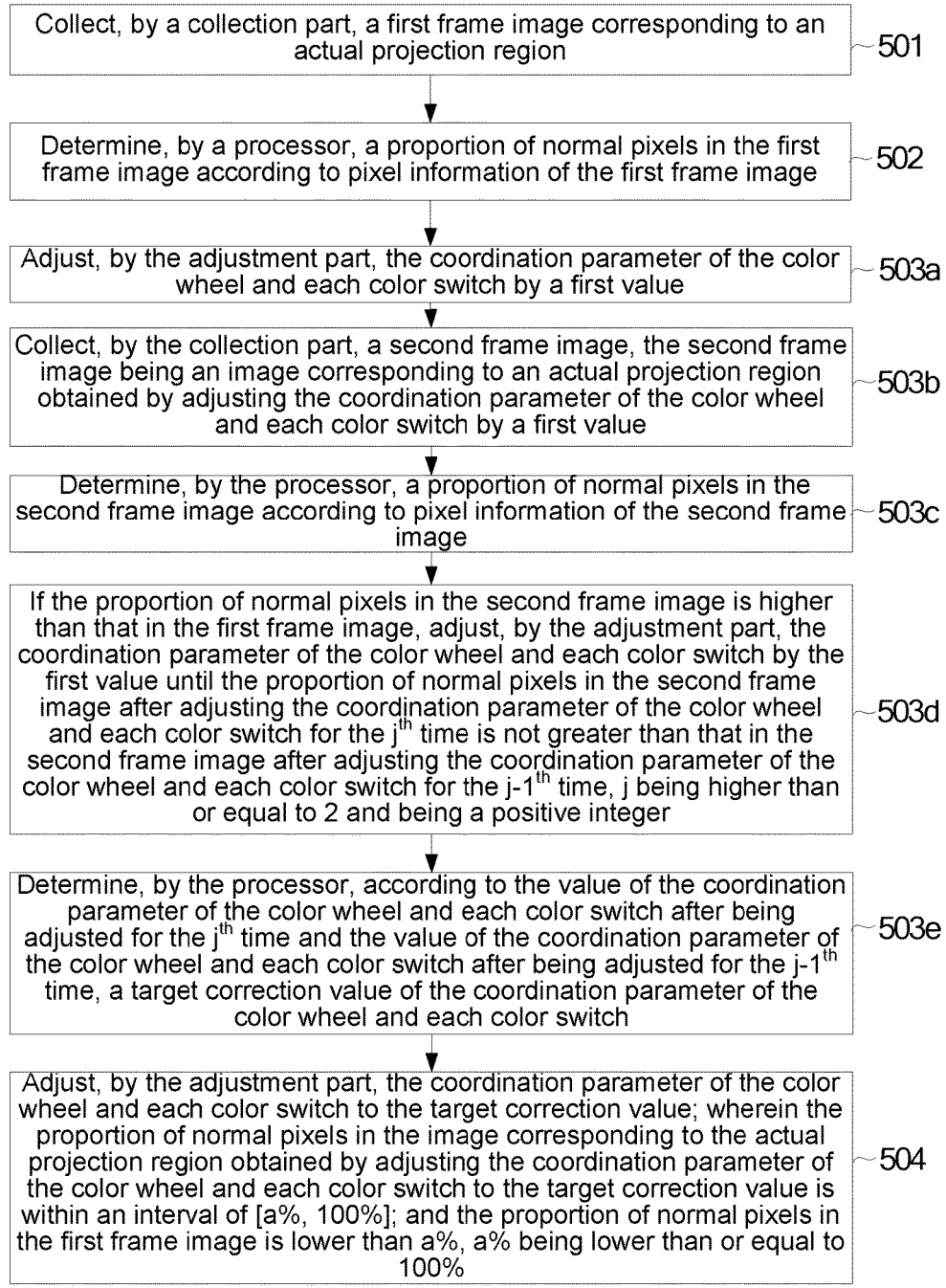
FIG. 8 is a schematic flowchart 4 of the automatic adjustment method for a color wheel according to one embodiment of the disclosure.

Further, to make the target correction value more accurate, that is to say, to make the proportion of normal pixels in the image corresponding to the actual projection region obtained by adjusting the coordination parameter of the color wheel and each color switch to the target correction value more approximate to 100%, in one embodiment of the disclosure, in S503e: before determining, by the processor, a target correction value of the coordination parameter of the color wheel and each color switch according to the value of the coordination parameter of the color wheel and each color switch after being adjusted for the $j^{th}$ time and the value of the coordination parameter of the color wheel and each color switch after being adjusted for the $j-1^{th}$ time, as shown in FIG. 8, the method can also include:

S503k: adjusting, by the adjustment part, the coordination parameter of the color wheel and each color switch by a fourth value, the fourth value and the first value being opposite in sign, an absolute value of the fourth value being lower than that of the first value;

S503l: collecting, by the collection part, a fourth frame image, the fourth frame image being an image corresponding to an actual projection region obtained by adjusting the coordination parameter of the color wheel and each color switch by the fourth value;

S503m: determining, by the processor, a proportion of normal pixels in the fourth frame image according to pixel information of the fourth frame image;

S503n: if the proportion of normal pixels in the fourth frame image is higher than that in the second frame image after adjusting the coordination parameter of the color wheel and each color switch for the $j^{th}$ time, adjusting, by the adjustment part, the coordination parameter of the color wheel and each color switch by the fourth value until the proportion of normal pixels in the fourth frame image after adjusting the coordination parameter of the color wheel and each color switch for the $m^{th}$ time is not greater than that in the fourth frame image after adjusting the coordination parameter of the color wheel and each color switch for the $m-1^{th}$ time, m being a positive integer.

The step S503e of determining, by the processor, according to the value of the coordination parameter of the color wheel and each color switch after being adjusted for the $j^{th}$ time and the value of the coordination parameter of the color wheel and each color switch after being adjusted for the $j-1^{th}$ time, a target correction value of the coordination parameter of the color wheel and each color switch includes:

S503o: determining, by the processor, according to the value of the coordination parameter of the color wheel and each color switch after being adjusted for the $m^{th}$ time and the value of the coordination parameter of the color wheel and each color switch after being adjusted for the $m-1^{th}$ time, a target correction value of the coordination parameter of the color wheel and each color switch.

That is to say, in the embodiment of the disclosure, a target correction value of the coordination parameter can be obtained after adjusting the coordination parameter of the color wheel and each color switch for many times in a way of gradually decreasing a step length (for example, halving the step length).

Wherein, the step length is specifically an increase in the coordination parameter each time when the coordination parameter of the color wheel and each color switch is adjusted in the same direction. For example, absolute values of the first value, the third value and the fourth value mentioned above can be called a step length, respectively.

For example, an initial angle of the red light portion of the color wheel is m. Assuming that the color wheel is adjusted by an angle a in a clockwise direction each time, after one adjustment, it is determined that the proportion of normal pixels in the obtained frame image is increased with respect to the proportion of normal pixels in the image obtained before this adjustment; and after i (i>1) times of adjustments, it is found that the proportion of the normal pixels in the frame image obtained anew is decreased with respect to the proportion of the normal pixels in the frame image obtained before the $i^{th}$ of adjustment. Then, again, the color wheel is adjusted by an angle b in a counterclockwise direction, the angle b being a half of the angle a. After j times of adjustments, it is found that the proportion of the normal pixels in the obtained frame image is decreased with respect to the proportion of the normal pixels in the frame image obtained before the $j^{th}$ time of adjustment. Thus, it can be confirmed that the median value between the angle obtained after the $j-1^{th}$ time of adjustment and the angle obtained after the $j^{th}$ time of adjustment is the desired angle. If more accurate data is required, the color wheel can be adjusted again by an angle c in the clockwise direction. After k times of adjustments, it is found that the proportion of the normal pixels in the obtained image is decreased with respect to the proportion of the normal pixels in the image obtained before the $k^{th}$ time of adjustment. Thus, it can be confirmed that the median value between the angle obtained after the $k-1^{th}$ time of adjustment and the angle obtained after the $k^{th}$ time of adjustment is the desired angle.

It should be noted that, before determining, according to the value of the coordination parameter of the color wheel and each color switch after being adjusted for the $k^{th}$ time and the value of the coordination parameter of the color wheel and each color switch after being adjusted for the $k-1^{th}$ time, a target correction value of the coordination parameter of the color wheel and each color switch, the target correction value can be further adjusted with reference to the method above. This will not be repeated here in the embodiment of the disclosure.

An automatic adjustment method for a color wheel according to one embodiment of the disclosure will be described by one specific embodiment below.

Assuming that the collected first frame image corresponding to the actual projection region is an image 1, according to the pixel information of the image 1, the proportion of normal pixels in the image 1 is determined as 95%. Here, the coordination parameter of the color wheel and each color switch is that the red switch is turned on 18 degrees later after the sensor detects the adhesive tape. The target correction value of the coordination parameter of the color wheel and each color switch can be determined by the following steps:

S1: The coordination parameter of the color wheel and each color switch is adjusted by 2 degrees, that is, the adjusted coordination parameter is that the red switch is turned on 20 degrees later after the sensor detects the adhesive tape.

S2: An image 2 is collected, and a proportion of normal pixels in the image 2 is determined according to pixel information of the image 2. Assuming that the proportion is 97%, steps S3a to S7a are continuously performed; and assuming that the proportion is 93%, steps S3b to S15b are continuously performed.

Steps S3a to S7a are as follows:

S3a: Since 97% is higher than 95%, the coordination parameter of the color wheel and each color switch can be continuously adjusted by 2 degrees, that is, the adjusted coordination parameter is that the red switch is turned on 22 degrees later after the sensor detects the adhesive tape.

S4a: An image 3 is collected, and a proportion of normal pixels in the image 3 is determined according to pixel information of the image 3 as 99%.

S5a: Since 99% is higher than 97%, the coordination parameter of the color wheel and each color switch can be continuously adjusted by 2 degrees, that is, the adjusted coordination parameter is that the red switch is turned on 24 degrees later after the sensor detects the adhesive tape.

S6a: An image 4 is collected, and a proportion of normal pixels in the image 4 is determined according to pixel information of the image 4 as 99%.

S7a: Since 99% is equal to 99%, a mean value of the value (i.e., the adjusted coordination parameter is that the red switch is turned on 22 degrees later after the sensor detects the adhesive tape) of the coordination parameter of the color wheel and each color switch after being adjusted for the $j-1^{th}$ time in the step S3a and the value (i.e., the adjusted coordination parameter is that the red switch is turned on 24 degrees later after the sensor detects the adhesive tape) of the coordination parameter of the color wheel and each color switch after being adjusted for the $j^{th}$ time in the step Sa is taken to obtain the target correction value of the coordination parameter of the color wheel and each color switch. That is, the target correction value is that the red switch is turned on 23 degrees later after the sensor detects the adhesive tape.

After determining the target correction value of the coordination parameter of the color wheel and each color switch by the steps S1 to S7a, the coordination parameter of the color wheel and each color switch is adjusted to the target correction value, that is, the red switch is turned on 23 degrees later after the sensor detects the adhesive tape. It can be verified that the proportion of normal pixels in the image corresponding to the actual projection region obtained subsequently is 100%.

Steps S3b to S15b are as follows:

S3b: Since 93% is lower than 95%, the coordination parameter of the color wheel and each color switch can be adjusted by −4 degrees, that is, the adjusted coordination parameter is that the red switch is turned on 16 degrees later after the sensor detects the adhesive tape.

S4b: An image 3 is collected, and a proportion of normal pixels in the image 3 is determined according to pixel information of the image 3 as 97%.

S5b: Since 97% is higher than 93%, the coordination parameter of the color wheel and each color switch can be continuously adjusted by −4 degrees, that is, the adjusted coordination parameter is that the red switch is turned on 12 degrees later after the sensor detects the adhesive tape.

S6b: An image 4 is collected, and a proportion of normal pixels in the image 4 is determined according to pixel information of the image 4 as 99%.

S7b: Since 99% is higher than 97%, the coordination parameter of the color wheel and each color switch can be continuously adjusted by −4 degrees, that is, the adjusted coordination parameter is that the red switch is turned on 8 degrees later after the sensor detects the adhesive tape.

S8b: An image 5 is collected, and a proportion of normal pixels in the image 5 is determined according to pixel information of the image 5 as 95%.

S9b: Since 95% is lower than 99%, the coordination parameter of the color wheel and each color switch can be adjusted by 2 degrees (i.e., half of 4 degrees mentioned above), that is, the adjusted coordination parameter is that the red switch is turned on 10 degrees later after the sensor detects the adhesive tape.

S10b: An image 6 is collected, and a proportion of normal pixels in the image 6 is determined according to pixel information of the image 6 as 97%.

S11b: Since 97% is higher than 95%, the coordination parameter of the color wheel and each color switch can be continuously adjusted by 2 degrees, that is, the adjusted coordination parameter is that the red switch is turned on 12 degrees later after the sensor detects the adhesive tape.

S12b: An image 7 is collected, and a proportion of normal pixels in the image 7 is determined according to pixel information of the image 7 as 99%.

S13b: Since 99% is higher than 97%, the coordination parameter of the color wheel and each color switch can be continuously adjusted by 2 degrees, that is, the adjusted coordination parameter is that the red switch is turned on 12 degrees later after the sensor detects the adhesive tape.

S14b: An image 8 is collected, and a proportion of normal pixels in the image 8 is determined according to pixel information of the image 8 as 99%.

S15b: Since 99% is equal to 99%, a mean value of the value (i.e., the adjusted coordination parameter is that the red switch is turned on 12 degrees later after the sensor detects the adhesive tape) of the coordination parameter of the color wheel and each color switch after being adjusted for the m−$1^{th}$ time in the step S11b and the value (i.e., the adjusted coordination parameter is that the red switch is turned on 14 degrees later after the sensor detects the adhesive tape) of the coordination parameter of the color wheel and each color switch after being adjusted for the $m^{th}$ time in the step S13b is taken to obtain the target correction value of the coordination parameter of the color wheel and each color switch. That is, the target correction value is that the red switch is turned on 13 degrees later after the sensor detects the adhesive tape.

After determining the target correction value of the coordination parameter of the color wheel and each color switch by the steps S1 to S15b, the coordination parameter of the color wheel and each color switch is adjusted to the target correction value, that is, the red switch is turned on 13 degrees later after the sensor detects the adhesive tape. It can be verified that the proportion of normal pixels in the image corresponding to the actual projection region obtained subsequently is 100%.

It should be noted that, in each example, the proportion of normal pixels in the image corresponding to the actual projection region obtained by adjusting the coordination parameter of the color wheel and each color switch to the target correction value is 100%. Of course, the proportion of normal pixels in the image corresponding to the actual projection region after several times of adjustments may not be all 100%, and the proportion can be about 100% after repeated adjustments. This is not specifically limited in the embodiment of the disclosure.

The automatic adjustment method for a color wheel provided in one embodiment of the disclosure includes: collecting a first frame image corresponding to an actual projection region; determining a proportion of normal pixels in the first frame image according to pixel information of the first frame image; determining a target correction value of coordination parameter of the color wheel and each color switch according to the proportion of normal pixels in the first frame image; and adjusting the coordination parameter of the color wheel and each color switch to the target correction value, wherein the proportion of normal pixels in the image corresponding to the actual projection region obtained by adjusting the coordination parameter of the color wheel and each color switch to the target correction value is within an interval of [a %, 100%], and wherein the proportion of normal pixels in the first frame image is lower than a %, a % being lower than or equal to 100%. On the basis of the automatic adjustment method for a color wheel provided by any one of the embodiments of the disclosure, on one hand, since the method is automatically completed by the apparatus independently of manual participation, the adjustment for the color wheel is more intelligent; and on the other hand, in this method, the proportion of normal pixels in the first frame image is determined according to the pixel information of the first frame image, and then, the target correction value of the coordination parameter of the color wheel and each color switch is further determined according to the proportion of normal pixels in the first frame image. That is to say, the target correction value is determined according to the proportion of normal pixels in the collected frame image corresponding to the actual projection region. However, generally, pixel points cannot be directly observed by human eyes. Thus, with respect to the way of adjusting the color wheel by manually according to the amount of vertical lines in the image card in the prior art, the target correction value determined according to the proportion of normal pixels in the collected frame mage corresponding to the actual projection region is obviously more accurate. As a result, the accuracy for adjusting the color wheel is eventually higher.

Figure 9:
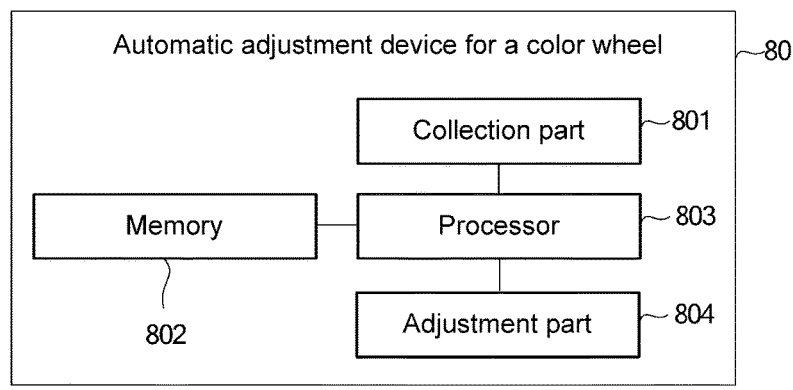
FIG. 9 is a schematic structure diagram of an automatic adjustment device for a color wheel according to one embodiment of the disclosure.

Another embodiment of the disclosure provides an automatic adjustment device 80 for a color wheel. As shown in FIG. 9, the automatic adjustment device 80 includes: a collection part 801, a memory 802, a processor 803 and an adjustment part 804.

The collection part 801 is configured to collect a first frame image corresponding to an actual projection region.

The memory 802 is configured to store programs.

The processor 803 is configured to read programs in the memory 802, and perform operations of: determining the proportion of normal pixels in the first frame image according to pixel information of the first frame image; and determining the target correction value of the coordination value of the color wheel and each color switch.

The adjustment part 804 is configured to adjust the coordination parameter of the color wheel and each color switch to the target correction value, wherein the proportion of normal pixels in the image corresponding to the actual projection region obtained by adjusting the coordination parameter of the color wheel and each color switch to the target correction value is within an interval of [a %, 100%], and wherein the proportion of normal pixels in the first frame image is lower than a %, a % being lower than or equal to 100%.

In one embodiment of the disclosure, wherein:

the adjustment part 804 is also configured to adjust the coordination parameter of the color wheel and each color switch by a first value.

The collection part 801 is also configured to collect a second frame image, the second frame image being an image corresponding to an actual projection region obtained by adjusting the coordination parameter of the color wheel and each color switch by the first value.

The processor 803 is also configured to determine a proportion of normal pixels in the second frame image according to pixel information of the second frame image.

The adjustment part 804 is also configured to: if the proportion of normal pixels in the second frame image is higher than that in the first frame image, adjust the coordination parameter of the color wheel and each color switch by the first value until the proportion of normal pixels in the second frame image after adjusting the coordination parameter of the color wheel and each color switch for the $j^{th}$ time is not greater than that in the second frame image after adjusting the coordination parameter of the color wheel and each color switch for the $j-1^{th}$ time, j being higher than or equal to 2 and being a positive integer.

The processor 803 is also configured to determine, according to the value of the coordination parameter of the color wheel and each color switch after being adjusted for the $j^{th}$ time and the value of the coordination parameter of the color wheel and each color switch after being adjusted for the $j-1^{th}$ time, a target correction value of the coordination parameter of the color wheel and each color switch.

In one embodiment of the disclosure, wherein:

the adjustment part 804 is also configured to: after determining a proportion of normal pixels in the second frame image is determined according to the pixel information of the second frame image, if the proportion of normal pixels in the second frame image is not greater than that in the first frame image, adjust the coordination parameter of the color wheel and each color switch by a third value, the third value and the first value being opposite in sign.

The collection part 801 is also configured to collect a third frame image, the third frame image being an image corresponding to an actual projection region obtained by adjusting the coordination parameter of the color wheel and each color switch by the third value.

The processor 803 is also configured to determine the proportion of normal pixels in the third frame image according to pixel information of the third frame image.

The adjustment part 804 is also configured to: if the proportion of normal pixels in the third frame image is higher than that in the second frame image, adjust the coordination parameter of the color wheel and each color switch by the third value until the proportion of normal pixels in the third frame image after adjusting the coordination parameter of the color wheel and each color switch for the $k^{th}$ time is not greater than that in the third frame image after adjusting the coordination parameter of the color wheel and each color switch for the $k-1^{th}$ time, k being higher than or equal to 3 and being a positive integer.

The processor 803 is configured to determine, according to the value of the coordination parameter of the color wheel and each color switch after being adjusted for the $k^{th}$ time and the value of the coordination parameter of the color wheel and each color switch after being adjusted for the $k-1^{th}$ time, a target correction value of the coordination parameter of the color wheel and each color switch.

In one embodiment of the disclosure, wherein:

the adjustment part 804 is also configured to, before determining the target correction value of the coordination parameter of the color wheel and each color switch according to the value of the coordination parameter of the color wheel and each color switch after being adjusted for the $j^{th}$ time and the value of the coordination parameter of the color wheel and each color switch after being adjusted for the $j-1^{th}$ time, adjust the coordination parameter of the color wheel and each color switch by a fourth value, the fourth value and the first value being opposite in sign, the absolute value of the fourth value being lower than that of the first value.

The collection part 801 is also configured to collect a fourth frame image, the fourth frame image being an image corresponding to an actual projection region obtained by adjusting the coordination parameter of the color wheel and each color switch by the fourth value.

The processor 803 is also configured to determine a proportion of normal pixels in the fourth frame image according to pixel information of the fourth frame image.

The adjustment part 804 is also configured to: if the proportion of normal pixels in the fourth frame image is higher than that in the second frame image after adjusting the coordination parameter of the color wheel and each color switch for the $j^{th}$ time, adjust the coordination parameter of the color wheel and each color switch by the fourth value until the proportion of normal pixels in the fourth frame image after adjusting the coordination parameter of the color wheel and each color switch for the $m^{th}$ time is not greater than that in the fourth frame image after adjusting the coordination parameter of the color wheel and each color switch for the $m-1^{th}$ time, m being a positive integer.

The processor 803 is specifically configured to:

determine, according to the value of the coordination parameter of the color wheel and each color switch after being adjusted for the $m^{th}$ time and the value of the coordination parameter of the color wheel and each color switch after being adjusted for the $m-1^{th}$ time, a target correction value of the coordination parameter of the color wheel and each color switch.

Preferably, the coordination parameter of the color wheel and each color switch comprises a coordination angle of the color wheel and each color switch or coordination duration of the color wheel and each color switch.

Specifically, the automatic adjustment method for a color wheel performed by the automatic adjustment device 80 for a color wheel provided by the embodiments of the disclosure can refer to the description of the above embodiments, and will not be further repeated here in the embodiments of the disclosure.

On the basis of the automatic adjustment device for a color wheel provided by any one of the embodiments of the disclosure, on one hand, since the method is automatically completed by the device independently of manual participation, the adjustment for the color wheel is more intelligent; and on the other hand, the device can determine the proportion of normal pixels in the first frame image according to the pixel information of the first frame image, and then determine the target correction value of the coordination parameter of the color wheel and each color switch according to the proportion of normal pixels in the first frame image. That is to say, in the automatic adjustment device, the target correction value is determined according to the proportion of normal pixels in the collected frame image corresponding to the actual projection region. However, generally, pixel points cannot be directly observed by human eyes. Thus, with respect to the way of adjusting the color wheel by manually according to the amount of vertical lines in the image card in the prior art, the target correction value determined by the automatic adjustment device according to the proportion of normal pixels in the collected frame image corresponding to the actual projection region is obviously more accurate. As a result, the accuracy for adjusting the color wheel is eventually higher.

Figure 10:
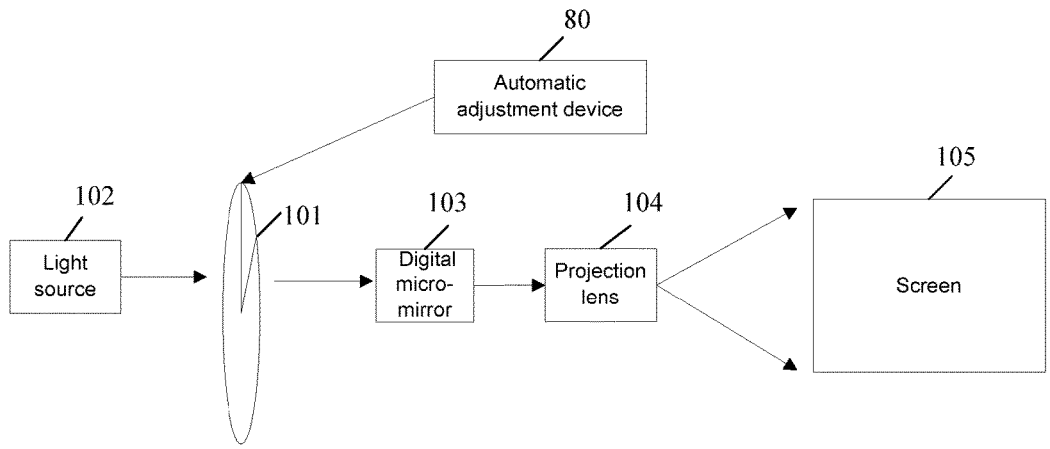
FIG. 10 is a schematic structure diagram of a digital light procession projector according to one embodiment of the disclosure.

In addition, as shown in FIG. 10, one embodiment of the disclosure provides a digital light procession projector, including a color wheel 101, and the automatic adjustment device 80 for a color wheel, described in any one of the embodiments above, acting on the color wheel 101. The structure and functions of the automatic adjustment device 80 for a color wheel in the digital light procession projector provided in this embodiment can refer to the description of the above embodiments, and will not be further repeated here. In addition, the digital light procession projector 90 can also include a light source 102, a digital micro-mirror device 103, a projection lens 104 and a screen 105 and the like. The light source 102 is configured to emit light; the color wheel 101 is configured to project light with required color onto the digital micro-mirror device 103; and the digital micro-mirror device 103 is configured to enable light to form a picture to be projected and project the picture onto the screen 105 by the projection lens 104. In addition, the digital light procession projector 90 can also include a color switch (not shown). The color switch can be located on the light source 102 or between the light source 102 and the color wheel 101 or between the color wheel 101 and the digital micro-mirror device 103, and is configured to adjust the color level of light from the color wheel 101 and the like.

The foregoing descriptions are merely specific implementations of the disclosure, and the protection scope of the disclosure is not limited thereto. Changes or replacements readily obtained by those skilled in the art within the technical scope disclosed in the disclosure shall fall into the protection scope of the disclosure. Thus, the protection scope of the disclosure shall be subject to the protection scope of the claims.

What is claimed is:

1. An automatic adjustment method for a color wheel, comprising:
   collecting, by a collector, a first frame image displayed on a display screen;
   determining, by one or more processors, a ratio of normal pixels with correct or substantially correct color coordinates in the first frame image to all pixels in the first frame image according to pixel information of the first frame image;
   determining, by the one or more processors, a target correction value of a coordination parameter of the color wheel with each color switch according to the ratio of normal pixels in the first frame image to all pixels in the first frame image, wherein the color switch is a switch controlling the color level of light emitted from the color wheel, the coordination parameter of the color wheel with each color switch comprises a coordination angle of the color wheel with each color switch or a coordination duration of the color wheel with each color switch; and
   adjusting, by the one or more processors, the coordination parameter of the color wheel with each color switch to the target correction value, so as to adjust the color level of the light emitted by the color wheel.

2. The method according to claim 1, wherein, before determining, by the one or more processors, a target correction value of a coordination parameter of the color wheel with each color switch according to the ratio of normal pixels in the first frame image to all pixels in the first frame image, further comprising:
   adjusting, by the one or more processors, the coordination parameter of the color wheel with each color switch by a first value;
   collecting, by the collector, a second frame image, the second frame image being an image corresponding to an actual projection region obtained by adjusting the coordination parameter of the color wheel with each color switch by a first value;
   determining, by the one or more processors, a ratio of normal pixels in the second frame image to all pixels in the second frame image according to pixel information of the second frame image;
   if the ratio of normal pixels in the second frame image to all pixels in the second frame image is higher than that in the first frame image, adjusting, by the one or more processors, the coordination parameter of the color wheel with each color switch by the first value until the ratio of normal pixels in the second frame image to all pixels in the second frame image after adjusting the coordination parameter of the color wheel with each color switch for the $j^{th}$ time is not greater than that in the second frame image after adjusting the coordination parameter of the color wheel with each color switch for the $j-1^{th}$ time, j being higher than or equal to 2 and being a positive integer; and
   determining, by the one or more processors, a target correction value of a coordination parameter of the color wheel with each color switch according to the ratio of normal pixels in the first frame image to all pixels in the first frame image comprises:
   determining, by the one or more processors, according to a value of the coordination parameter of the color wheel with each color switch after being adjusted for the $j^{th}$ time and a value of the coordination parameter of the color wheel with each color switch after being adjusted for the $j-1^{th}$ time, a target correction value of the coordination parameter of the color wheel with each color switch.

3. The method according to claim 2, wherein, after determining, by the one or more processors, a ratio of normal pixels in the second frame image to all pixels in the second frame image according to pixel information of the second frame image, further comprising:
   if the ratio of normal pixels in the second frame image to all pixels in the second frame image is not greater than that in the first frame image, adjusting, by the one or more processors, the coordination parameter of the color wheel with each color switch by a third value, the third value and the first value being opposite in sign;
   collecting, by the collector, a third frame image, the third frame image being an image corresponding to an actual projection region obtained by adjusting the coordination parameter of the color wheel with each color switch by the third value;
   determining, by the one or more processors, a ratio of normal pixels in the third frame image to all pixels in the third frame image according to pixel information of the third frame image;
   if the ratio of normal pixels in the third frame image to all pixels in the third frame image is higher than that in the second frame image, adjusting, by the one or more processors, the coordination parameter of the color wheel with each color switch by the third value until the ratio of normal pixels in the third frame image to all pixels in the third frame image after adjusting the coordination parameter of the color wheel with each color switch for the $k^{th}$ time is not greater than that in the third frame image after adjusting the coordination parameter of the color wheel with each color switch for the $k-1^{th}$ time, k being higher than or equal to 3 and being a positive integer; and determining, by the processor, a target correction value of the coordination parameter of the color wheel with each color switch according to the ratio of normal pixels in the first frame image to all pixels in the first frame image comprises:

determining, by the processor, according to a value of the coordination parameter of the color wheel with each color switch after being adjusted for the $k^{th}$ time and a value of the coordination parameter of the color wheel with each color switch after being adjusted for the $k-1^{th}$ time, a target correction value of the coordination parameter of the color wheel with each color switch.

4. The method according to claim 2, wherein, before determining, by the one or more processors, according to the value of the coordination parameter of the color wheel with each color switch after being adjusted for the $j^{th}$ time and the value of the coordination parameter of the color wheel with each color switch after being adjusted for the $j-1^{th}$ time, a target correction value of the coordination parameter of the color wheel with each color switch, further comprising:

adjusting, by the one or more processors, the coordination parameter of the color wheel with each color switch by a fourth value, the fourth value and the first value being opposite in sign, an absolute value of the fourth value being lower than that of the first value;

collecting, by the collector, a fourth frame image, the fourth frame image being an image corresponding to an actual projection region obtained by adjusting the coordination parameter of the color wheel with each color switch by the fourth value;

determining, by the one or more processors, a ratio of normal pixels in the fourth frame image to all pixels in the fourth frame image according to pixel information of the fourth frame image;

if the ratio of normal pixels in the fourth frame image to all pixels in the fourth frame image is higher than that in the second frame image after adjusting the coordination parameter of the color wheel with each color switch for the $j^{th}$ time, adjusting, by the one or more processors, the coordination parameter of the color wheel with each color switch by the fourth value until the ratio of normal pixels in the fourth frame image to all pixels in the fourth frame image after adjusting the coordination parameter of the color wheel with each color switch for the $m^{th}$ time is not greater than that in the fourth frame image after adjusting the coordination parameter of the color wheel with each color switch for the $m-1^{th}$ time, m being a positive integer; and determining, by the one or more processors, according to the value of the coordination parameter of the color wheel with each color switch after being adjusted for the $j^{th}$ time and the value of the coordination parameter of the color wheel with each color switch after being adjusted for the $j-1^{th}$ time comprises:

determining, by the one or more processors, according to a value of the coordination parameter of the color wheel with each color switch after being adjusted for the $m^{th}$ time and a value obtained by adjusting the coordination parameter of the color wheel with each color switch after being adjusted for the $m-1^{th}$ time, a target correction value of the coordination parameter of the color wheel with each color switch.

5. An automatic adjustment device for a color wheel, comprising: a collector, one or more processors and a memory;

the collector is configured to collect a first frame image displayed on a display screen, the memory is configured to store programs, the one or more processors are configured to read programs in the memory and perform operations of:

determining a ratio of normal pixels with correct or substantially correct color coordinates in the first frame image to all pixels in the first frame image according to the pixel information of the first frame image;

determining a target correction value of a coordination parameter of the color wheel with each color switch according to the ratio of normal pixels in the first frame image to all pixels in the first frame image, wherein the color switch is a switch controlling the color level of light emitted from the color wheel, the coordination parameter of the color wheel with each color switch comprises a coordination angle of the color wheel with each color switch or a coordination duration of the color wheel with each color switch; and adjusting the coordination parameter of the color wheel with each color switch to the target correction value, so as to adjust the color level of the light emitted by the color wheel.

6. The automatic adjustment device according to claim 5, wherein the one or more processors are also configured to adjust the parameter of the color wheel with each color switch by a first value;

the collector is also configured to collect a second frame image, the second frame image being an image corresponding to an actual projection region obtained by adjusting the coordination parameter of the color wheel with each color switch by the first value;

the one or more processors are also configured to:

determine a ratio of normal pixels in the second frame image to all pixels in the second frame image according to pixel information of the second frame image;

if the ratio of normal pixels in the second frame image to all pixels in the second frame image is higher than that in the first frame image, adjust the coordination parameter of the color wheel with each color switch by the first value until the ratio of normal pixels in the second frame image to all pixels in the second frame image after adjusting the coordination parameter of the color wheel with each color switch for the $j^{th}$ time is not greater than that in the second frame image after adjusting the coordination parameter of the color wheel with each color switch for the $j-1^{th}$ time, j being higher than or equal to 2 and being a positive integer; and determine, according to a value of the coordination parameter of the color wheel with each color switch after being adjusted for the $m^{th}$ time and a value of the coordination parameter of the color wheel with each color switch after being adjusted for the $m-1^{th}$ time, a target correction value of the coordination parameter of the color wheel with each color switch.

7. The automatic adjustment device according to claim 6, wherein the one or more processors are also configured to: after determining a ratio of normal pixels in the second frame image to all pixels in the second frame image is determined according to the pixel information of the second frame image, if the ratio of normal pixels in the second frame image to all pixels in the second frame image is not greater than that in the first frame image, adjust the coordination parameter of the color wheel with each color switch by a third value, the third value and the first value being opposite in sign;

the collector is also configured to collect a third frame image, the third frame image being an image corresponding to an actual projection region obtained by adjusting the coordination parameter of the color wheel with each color switch by the third value;

the one or more processors are also configured to:

determine a ratio of normal pixels in the third frame image to all pixels in the third frame image according to pixel information of the third frame image;

if the ratio of normal pixels in the third frame image to all pixels in the third frame image is higher than that in the second frame image, adjust the coordination parameter of the color wheel with each color switch by the third value until the ratio of normal pixels in the third frame image to all pixels in the third frame image after adjusting the coordination parameter of the color wheel with each color switch for the $k^{th}$ time is not greater than that in the third frame image after adjusting the coordination parameter of the color wheel with each color switch for the $k-1^{th}$ time, k being higher than or equal to 3 and being a positive integer; and determine, according to a value of the coordination parameter of the color wheel with each color switch after being adjusted for the $k^{th}$ time and a value of the coordination parameter of the color wheel with each color switch after being adjusted for the $k-1^{th}$ time, a target correction value of the coordination parameter of the color wheel with each color switch.

8. The automatic adjustment device according to claim 6, wherein the one or more processors are configured to, before determining, according to the value of the coordination parameter of the color wheel with each color switch after being adjusted for the $j^{th}$ time and the value of the coordination parameter of the color wheel with each color switch after being adjusted for the $j-1^{th}$ time, a target correction value of the coordination parameter of the color wheel with each color switch, adjust the coordination parameter of the color wheel with each color switch by a fourth value, the fourth value and the first value being opposite in sign, the absolute value of the fourth value being lower than that of the first value;

the collector is also configured to collect a fourth frame image, the fourth frame image being an image corresponding to an actual projection region obtained by adjusting the coordination parameter of the color wheel with each color switch by the fourth value;

the one or more processors are also configured to:

determine a ratio of normal pixels in the fourth frame image to all pixels in the fourth frame image according to pixel information of the fourth frame image;

if the ratio of normal pixels in the fourth frame image to all pixels in the fourth frame image is higher than that in the second frame image after adjusting the coordination parameter of the color wheel with each color switch for the $j^{th}$ time, adjust the coordination parameter of the color wheel with each color switch by the fourth value until the ratio of normal pixels in the fourth frame image to all pixels in the fourth frame image after adjusting the coordination parameter of the color wheel with each color switch for the $m^{th}$ time is not greater than that in the fourth frame image after adjusting the coordination parameter of the color wheel with each color switch for the $m-1^{th}$ time, m being a positive integer; and determine, according to a value of the coordination parameter of the color wheel with each color switch after being adjusted for the $m^{th}$ time and a value of the coordination parameter of the color wheel with each color switch after being adjusted for the $m-1^{th}$ time, a target correction value of the coordination parameter of the color wheel with each color switch.

9. A digital light procession projector, comprising a color wheel and an automatic adjustment device acting on the color wheel, the automatic adjustment device for the color wheel comprising a collector, one or more processors and a memory, the collector is configured to collect a first frame image displayed on a display screen, the memory is configured to store programs, the one or more processors are configured to read programs in the memory and perform operations of:

determining a ratio of normal pixels in the first frame image to all pixels with correct or substantially correct color coordinates in the first frame image according to pixel information of the first frame image;

determining a target correction value of a coordination parameter of the color wheel with each color switch according to the ratio of normal pixels in the first frame image to all pixels in the first frame image, wherein the color switch is a switch controlling the color level of light emitted from the color wheel, the coordination parameter of the color wheel with each color switch comprises a coordination angle of the color wheel with each color switch or a coordination duration of the color wheel with each color switch; and adjusting the coordination parameter of the color wheel with each color switch to the target correction value, so as to adjust the color level of the light emitted by the color wheel.

10. The digital light procession projector according to claim 9, wherein the one or more processors are also configured to adjust the coordination parameter of the color wheel with each color switch by a first value;

the collector is also configured to collect a second frame image, and the second frame image being an image corresponding to an actual projection region obtained by adjusting the coordination parameter of the color wheel with each color switch by the first value;

the one or more processors are also configured to:

determine a ratio of normal pixels in the second frame image to all pixels in the second frame image according to pixel information of the second frame image;

if the ratio of normal pixels in the second frame image to all pixels in the second frame image is higher than that in the first frame image, adjust the coordination parameter of the color wheel with each color switch by the first value until the ratio of normal pixels in the second frame image to all pixels in the second frame image after adjusting the coordination parameter of the color wheel with each color switch for the $j^{th}$ time is not greater than that in the second frame image after adjusting the coordination parameter of the color wheel with each color switch for the $j-1^{th}$ time, j being higher than or equal to 2 and being a positive integer; and determine, according to a value of the coordination parameter of the color wheel with each color switch after being adjusted for the $m^{th}$ time and a value of the coordination parameter of the color wheel with each color switch after being adjusted for the $m-1^{th}$ time, a target correction value of the coordination parameter of the color wheel with each color switch.

11. The digital light procession projector according to claim 10, wherein the one or more processors are also configured to, after determining a ratio of normal pixels in the second frame image to all pixels in the second frame image is determined according to the pixel information of the second frame image, if the ratio of normal pixels in the second frame image to all pixels in the second frame image is not greater than that in the first frame image, adjust the coordination parameter of the color wheel with each color switch by a third value, the third value and the first value being opposite in sign;

the collector is also configured to collect a third frame image, the third frame image being an image corresponding to an actual projection region obtained by adjusting the coordination parameter of the color wheel with each color switch by the third value;

the one or more processors are also configured to:

determine a ratio of normal pixels in the third frame image to all pixels in the third frame image according to pixel information of the third frame image;

if the ratio of normal pixels in the third frame image to all pixels in the third frame image is higher than that in the second frame image, adjust the coordination parameter of the color wheel with each color switch by the third value until the ratio of normal pixels in the third frame image to all pixels in the third frame image after adjusting the coordination parameter of the color wheel with each color switch for the $k^{th}$ time is not greater than that in the third frame image after adjusting the coordination parameter of the color wheel with each color switch for the $k-1^{th}$ time, k being higher than or equal to 3 and being a positive integer; and determine, according to a value of the coordination parameter of the color wheel with each color switch after being adjusted for the $k^{th}$ time and a value of the coordination parameter of the color wheel with each color switch after being adjusted for the $k-1^{th}$ time, a target correction value of the coordination parameter of the color wheel with each color switch.

12. The digital light procession projector according to claim 10, wherein the one or more processors are also configured to, before determining, according to the value of the coordination parameter of the color wheel with each color switch after being adjusted for the $j^{th}$ time and the value of the coordination parameter of the color wheel with each color switch after being adjusted for the $j-1^{th}$ time, a target correction value of the coordination parameter of the color wheel with each color switch, adjust the coordination parameter of the color wheel with each color switch by a fourth value, the fourth value and the first value being opposite in sign, the absolute value of the fourth value being lower than that of the first value, the collector is also configured to collect a fourth frame image, the fourth frame image being an image corresponding to an actual projection region obtained by adjusting the coordination parameter of the color wheel with each color switch by the fourth value, the one or more processors are also configured to:

determine a ratio of normal pixels in the fourth frame image to all pixels in the fourth frame image according to pixel information of the fourth frame image, if the ratio of normal pixels in the fourth frame image to all pixels in the fourth frame image is higher than that in the second frame image after adjusting the coordination parameter of the color wheel with each color switch for the $j^{th}$ time, adjust the coordination parameter of the color wheel with each color switch by the fourth value until the ratio of normal pixels in the fourth frame image to all pixels in the fourth frame image after adjusting the coordination parameter of the color wheel with each color switch for the $m^{th}$ time is not greater than that in the fourth frame image after adjusting the coordination parameter of the color wheel with each color switch for the $m-1^{th}$ time, m being a positive integer; and determine, according to a value of the coordination parameter of the color wheel with each color switch after being adjusted for the $m^{th}$ time and a value of the coordination parameter of the color wheel with each color switch after being adjusted for the $m-1^{th}$ time, a target correction value of the coordination parameter of the color wheel with each color switch.

13. The method according to claim 1, wherein the normal pixel is a pixel having same position information in the first frame image as a pixel in an image to be projected corresponding to the first frame image and having pixel information approximately equal to pixel information of the pixel in the image to be projected.

14. The method according to claim 1, wherein the normal pixel is a pixel having pixel information approximately equal to predetermined pixel information.

15. The automatic adjustment device according to claim 5, wherein, the normal pixel is a pixel having same position information in the first frame image as a pixel in an image to be projected corresponding to the first frame image and having pixel information approximately equal to pixel information of the pixel in the image to be projected.

16. The automatic adjustment device according to claim 9, wherein the normal pixel is a pixel having pixel information approximately equal to predetermined pixel information.

17. The digital light procession projector according to claim 9, wherein, the normal pixel is a pixel having same position information in the first frame image as a pixel in an image to be projected corresponding to the first frame image and having pixel information approximately equal to pixel information of the pixel in the image to be projected.

* * * * *